Figure 1:
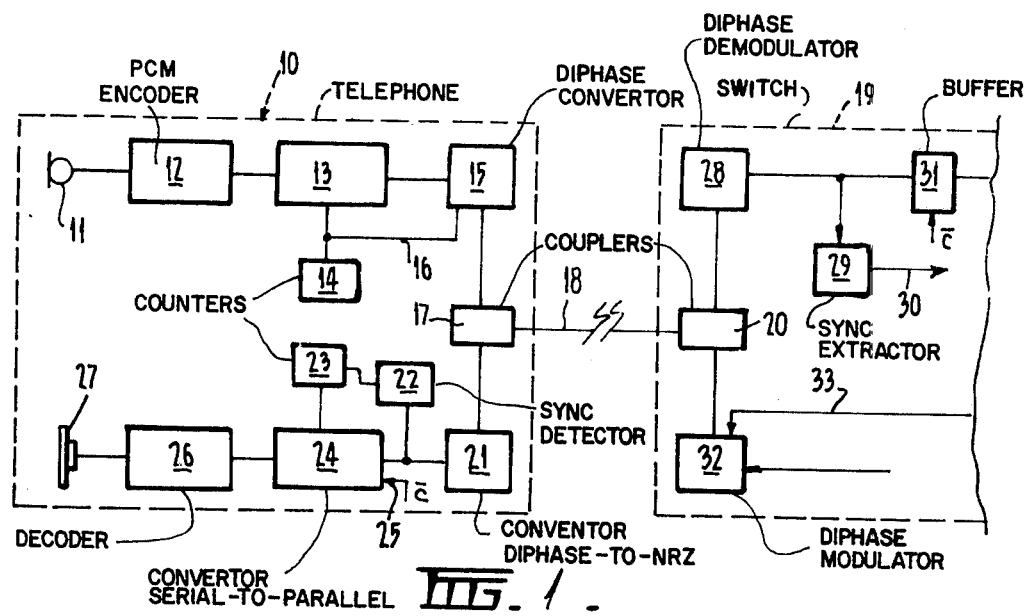

United States Patent [19]

Herschtal

[11] 4,131,763
[45] Dec. 26, 1978

[54] BIT SWITCHING OF WORD SYNCHRONIZED DATA

[75] Inventor: Ludwik Herschtal, North Balwyn, Australia

[73] Assignee: L M Ericsson Pty. Ltd., Broadmeadows, Australia

[21] Appl. No.: 833,892

[22] Filed: Sep. 16, 1977

[51] Int. Cl.² ............................................. H04J 3/06
[52] U.S. Cl. ............................................. 179/15 BS
[58] Field of Search ....................... 179/15 BS, 15 BY

[56] References Cited

U.S. PATENT DOCUMENTS

| 3,576,947 | 5/1971 | Kruger | 179/15 BS X |
| 3,987,250 | 10/1976 | Barbier et al. | 179/15 BD |
| 3,995,119 | 11/1976 | Pachynski, Jr. | 179/15 AF |
| 4,054,754 | 10/1977 | Nicodemus et al. | 179/15 BS |

FOREIGN PATENT DOCUMENTS 1263006  2/1972  United Kingdom ............... 179/15 BY Primary Examiner—Thomas W. Brown
Attorney, Agent, or Firm—Cushman, Darby & Cushman

[57] ABSTRACT

The invention relates to a digital data switch for serially bit-switching word synchronized Pulse Code Modulated (PCM) data from inlets to outlets of the switch. The switch is particularly intended for use in situations wherein PCM data words arriving at the switch on different inlets are not aligned in so far as word boundaries are concerned. The PCM data is bi-polar or diphase modulated and the synchronization information of each word consists of a violation of the modulation. The switch includes a demodulator on each inlet for demodulating the data and a synchronization detect circuit associated with each demodulator for detecting the synchronization information in each incoming data word. The switch has two functionally identical time division multiplexed switch paths; one being a data path and the other being a by-path for switching the synchronization information. The synchronization information is thereby switched simultaneously through the switch in parallel with the associated data word such that both the data word and synchronization information arrive at the appropriate outlet according to the connection required through the switch. Each outlet has a modulator for receiving the data word and synchronization information and bi-polar or diphase modulating the outgoing data from the switch and causing an appropriate violation of the modulation in response to the synchronization information.

5 Claims, 2 Drawing Figures

BIT SWITCHING OF WORD SYNCHRONIZED DATA

The present invention relates to digital data transmission systems and more particularly to an improved method and means for switching digital word synchronized data at intermediate digital exchanges.

Conventionally, means for switching digital word synchronized or word formated data such as PCM data comprises a digital switch wherein the data is switched in word format by switching the bits of each word in parallel through the switch. Such a switch is inefficient in smaller applications in that it requires an identical switch path for each data bit of each word. Furthermore, if the analogue to digital (A/D) and digital to analogue (D/A) conversion is done in the terminals and the terminals are remote from the switch, the digital data is usually transmitted serially in a bipolar or diphase modulated form. This data must be demodulated before switching and modulated again after switching. It is also necessary to convert the serially transmitted data to parallel form for switching and vice versa. This further adds to the complexity and hence the cost of a parallel word switch.

In larger switches, internal speed limitations necessitate the use of word switches which are generally multistage, for example, 3 stage (Time-Space-Time) word switches. However, in the small exchanges considered here, switching is done serially, one bit at a time. The description below refers to a single stage (Time) serial bit switch but the principles described apply equally to a multistage serial bit switch such as a Time-Space-Time switch for example.

Of course bit switches for switching unsynchronized data such as delta modulated data are well known and are widely used in small exchanges. However, such switches are unsuitable for switching word formated data as there is no provision for transferring word synchronizing information.

It is therefore an object of the present invention to provide a switch or exchange for use in smaller applications (for example PABX's) for switching word synchronized data in serial bit format, thus avoiding the aforementioned disadvantages of word formated switches.

It is a further object of this invention to provide a method for switching word synchronized data in serial bit format, thus avoiding the aforementioned disadvantages of word formated switches.

Accordingly the invention provides a method for serially bit-switching word synchronized digital data in a digital switch comprising separating synchronizing information from each word prior to switching, serially bit-switching the word via a single data path to a required outlet and simultaneously switching said synchronization information via a switch by-path to said outlet to enable recombining of said synchronization information with the appropriate word at said outlet.

According to a further form the invention provides a digital switch for serially bit-switching word synchronized digital data between a plurality of inlets and outlets to said switch comprising a word synchronization extract circuit associated with each inlet for extracting synchronization information from each data word at each inlet, a switch data path for serially bit-switching data from a particular inlet to a particular outlet, a switch by-path for serially bit-switching said synchronization information simultaneously with its associated data to said particular outlet and a word synchronization insert circuit associated with each outlet for inserting said synchronization information with each data word out of said switch.

Figure 2:
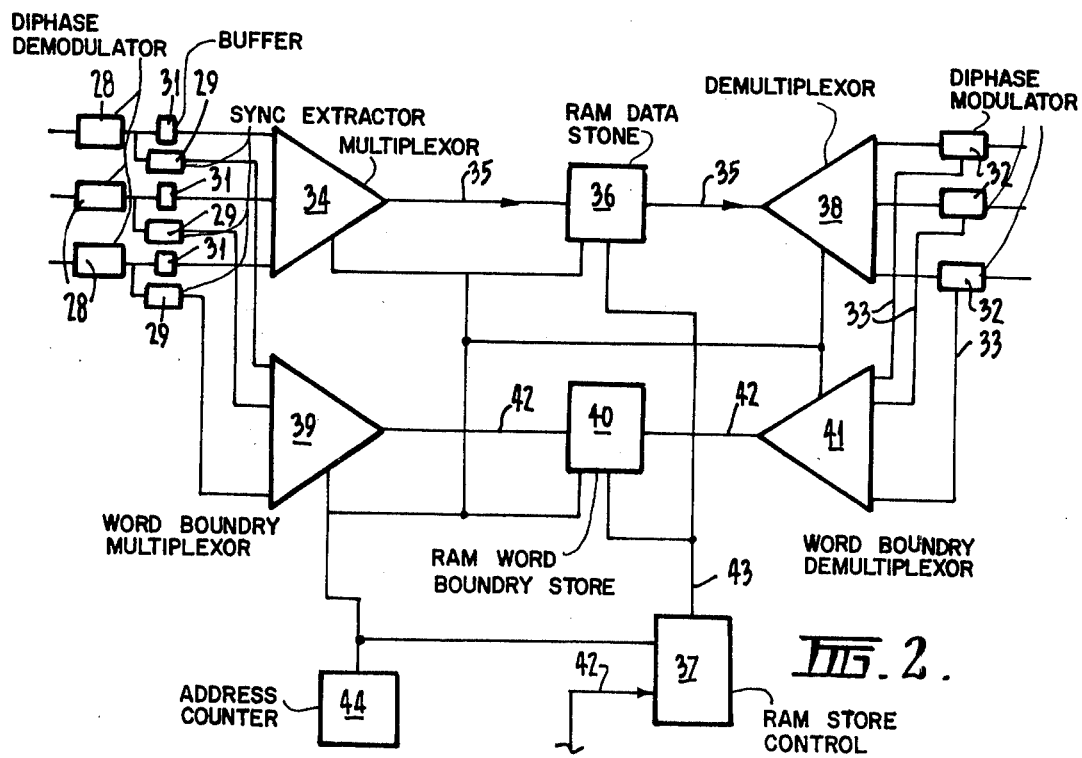

In order that the invention may be more readily understood, one particular embodiment will now be described with reference to the accompanying drawings wherein:

FIG. 1 is a simplified circuit block diagram of a terminal and the input to a digital switch according to the embodiment, and FIG. 2 is a simplified circuit block diagram of the switch according to the embodiment.

Referring now to FIG. 1 there is shown a typical terminal of a digital telephone system, namely a digital telephone 10, wherein analogue VF signals received by microphone 11 are converted into a digital bit stream by encoder 12. Encoder 12 is an eight-bit PCM encoder. The eight-bit parallel data from encoder 12 is converted to serial form in parallel to serial (P/S) convertor 13 under control of a three-bit outgoing counter 14. The output of P/S convertor 13, which incidentally is a multiplexor, is nonreturn-to-zero (NRZ) data which is converted to diphased data in convertor 15 also under control from counter 14. Gate circuits (not shown) in connection 16 cause the diphasing in convertor 15 to be violated on the least significant bit (LSB) of each PCM word. In other words the LSB bit of each PCM word is sent to line undiphased in order to provide a word synchronizing bit for each data word. This form of synchronization is known as in-band synchronization. Hybrid 17 separates incoming and outgoing data on line 18 which is a two wire transmission line connected to digital exchange or switch 19 (part of which is shown in FIG. 1) via a further hybrid 20. Alternatively the connection may be 4-wire thus obviating the need for hybrids.

In a converse manner data received at the terminal 10 passes via hybrid 17 to convertor 21 which converts diphased data to NRZ data. Prior to this conversion, however, the data is applied to an oscillator (not shown) tuned to twice the incoming line frequency from which a further circuit (not shown) is adapted to generate clock signal for the devices of the terminal. The further circuit also generates a reverse clock phase signal c as there is no reference between incoming data and the extracted clock in this method of clock generation. A word synchronization detector 22 selects the pulses in the incoming data corresponding to the diphase violation and uses this information to reset incoming counter 23. A serial to parallel (S/P) convertor 24 converts the bit stream to parallel form under control of counter 23. The reversed clock phase signal c is applied to S/P convertor 24 on 25 to restore the bit whose diphase was violated, to its correct NRZ value. The analogue signal is restored in decoder 26 and applied to receiver 27.

The above description of FIG. 1 relates to the generation and reception, in terminal devices (telephones) of the system, of a word formated digital bit stream in the form of an eightbit PCM word. The data is diphased data of 64KHz and synchronization is achieved by diphase violation of one of the eight bits, say the least significant bit (LSB) which may be also used for in band signalling. Alternatively, the diphase violation can be on an additional, say 9th bit, which can carry signalling information simultaneously. This is known as out-of-band signalling and synchronization. As will be appreciated from the following description other forms of word formated data may be switched according to the method and apparatus of the invention.

Reference should now be made to the part of FIG. 1 relating to switch 19 and to FIG. 2 which show the digital switch according to this embodiment. Data received at the switch from a terminal is firstly converted from diphased data to NRZ data by diphase demodulator 28 and the synchronization signals are detected by word synchronization extractor 29 which provides word synchronization pulses on connection 30 for switching through the switch as will be apparent hereinbelow. The NRZ data from demodulator 28 is reclocked in buffer 31 to provide a de-diphased serial data bit stream for switching in the switch. In a converse manner data which has been switched in the switch 19 is converted from NRZ to diphase in modulator 32 where word synchronization information on 33, which has been correspondingly switched, is combined with the outgoing data to the terminal 10.

The switch 19 is shown more fully in FIG. 2 and includes a bit switch in the general form of a single stage memory switch as has been previously used for switching non word formated data. Only one switch group comprising sixtyfour inlets and outlets is shown, as the switch may be readily increased in size by adding similar modules. Sixtyfour incoming lines provide the data to a similar number of the demodulators 28, synchronization extractors 29 and buffers 31 as shown, which perform the functions described above. The de-diphased data is applied to respective inlets of sixtyfour input data multiplexor 34 whereby the 64 Kb/s data is time multiplexed onto a single data highway 35 at 4 Mb/s. The data is re-arranged on the highway 35 in order to switch inlet lines to outlet lines by means of a single stage RAM data store 36 controlled by RAM control store 37. The output of RAM 36 is switched via the highway 35 to data demultiplexor 38 where the data bits at 4 Mb/s are distributed to the outgoing channels at 64 Kb/s. Diphasing and synchronization takes place in modulators 32. The above described switching part of switch 19 is known per se.

In order to switch word formated data, the word synchronization or word boundary must be preserved across the switch (the switch introduces a delay on some connections, depending on relation of incoming and outgoing addresses) and in this regard the exchange according to the invention is made "transparent" as far as the word boundary is concerned. This means that incoming lines to the switch are not word aligned and that word synchronization is not generated in the switch. Synchronization bits are simply repeated from exchange inlet to outlet and any correction for loss of synchronization is left to the terminals. Since the switch cannot handle diphase signals it cannot therefore transfer word boundary information in the form of diphase violations from inlet to outlet.

To this end the switch includes a word boundary or synchronization by-path which is functionally identical to the main data switch path described above. The by-path consists essentially of word boundary multiplexor 39, RAM word boundary store 40 and word boundary demultiplexor 41 all of which combine to switch the word boundary information via a single highway 42 under control from RAM control store 37. The occurrence of a synchronization bit in incoming word formated data is detected before the data is reclocked by buffer 31, as otherwise the diphase violations would be lost. Furthermore, the synchronization bit must be attached to the correct data bit at the output of the switch.

For this purpose the word synchronization extract unit 29 extracts the synchronization information and produces a signal ONE when the corresponding data bit has its diphase violated. This information is switched through from inlet to outlet simultaneously and in parallel with the corresponding data bit so that both data and synchronization appear automatically at the correct outlet. The synchronization information is used to re-diphase violate the outgoing bit in the relevant modulator 32.

The use of the by-path in no way changes the remainder of the switch and in fact the control system for the switch (not shown) need not be aware of the presence of a by-path. The control system provides control information on connection 45, causing the control store 37 to put the appropriate address on connection 43, thus causing the data bits relevant to a particular connection to be written into a particular location in RAM 36 and the synchronization bit to be written into a corresponding location in RAM 40.

An address counter 44 provides address information to the relevant units of the switch as shown in the drawings.

A further feature of the above described embodiment relates to signalling information which, conveniently, is located in a predetermined position relative to the synchronization bit of each PCM word, thus enabling its ready identification at any point in the system. For example the signalling bit may be the bit which actually carries the synchronization information in which case signalling and synchronization occurs during the LSB of the PCM word.

The advantage of the synchronization by-path for signalling is that the appearance of a synchronization pulse on the by-path highway may be used as a label to divert a signalling bit from the data path at the inlet to RAM 36 to a central signalling processor and to insert the signalling bit from the signalling processor onto the data path at the outlet side of RAM 36. This can be achieved by simple gating (not shown).

It should be apparent that the present invention provides a simple bit switch suitable for switching word formated data in serial form, thus avoiding parallel paths through the switch for each data bit in each word. Of course the switch of the invention does require effectively a duplication of the data path through the switch for the purpose of switching synchronization information but for smaller switches this duplication, and the inefficiency resulting from the by-path not being used to its full capacity, is insignificant when compared with a parallel data word switch. Use of the invention in digital data systems such as subscriber-to-subscriber telephone systems facilitates a system having end-to-end transmission of digital, word synchronized data, without the need for synchronization or word alignment at intermediate digital exchanges which are functionally "transparent" to the synchronization information.

It should be pointed out that in the foregoing description it was assumed that analogue to digital and digital to analogue conversion was carried out at remote terminals or telephones and that bipolar and diphase modulation was necessary for reasons of transmission between the terminals and the digital switch.

I claim:

1. A method for serially bit-switching word synchronized digital data whereby the synchronization information is separated from its associated data word prior to switching, each data word is serially bit switched via a single data path to a required outlet and information relevant to said sychronization information is switched simultaneously with said associated data word, via a switch by-path, to said outlet to provide for appropriate re-combination of synchronization information with said related data word at said outlet, said word synchronized data being bi-polar or diphase modulated data and said synchronization information being in-band and being a violation of said modulation, said synchronization information being separated from its associated data word by demodulating said data to provide non-return-to-zero data prior to switching.

2. A method as defined in claim 1 characterized in that said synchronization information is used to identify signalling information in said data words.

3. A digital data switch for serially bit-switching word synchronized digital data between a plurality of inlets and outlets to said switch, said switch including word synchronization extract circuitry associated with each said inlet for extracting synchronization information from each data word at each inlet and providing digital information relevant to the occurrence of said synchronization information, a switch data path for serially bit switching the data of each data word from a particular inlet to a particular outlet, a switch by-path for switching said digital information relevant to the occurrence of said synchronization information simultaneously with its associated data word to said particular outlet and word synchronization insert circuitry associated with each said outlet for appropriately re-combining said synchronization information with each data word in response to said digital information relevant to the occurrence of said synchronization information, said word synchronized data being bi-polar or diphase modulated data and said synchronization information consisting of violations of said modulation, each said word synchronization extract circuitry detecting said violations and providing said digital information relevant to the occurrence of said synchronization information, each said word synchronization extract circuitry including further circuitry for converting said bi-polar modulated data to nonreturn-to-zero (NRZ) data for bit switching via said data path.

4. A digital data switch as defined in claim 3 wherein said switch data path includes a multiplexor for time multiplexing data from said inlets onto a common data highway, a data store on said highway for re-arranging the order of the data on said highway under control from a control store and a demultiplexor for receiving the re-arranged data from said highway and time demultiplexing the data to said outlets, said switch by-path including a multiplexor, data store, highway and demultiplexor arranged the same as said data path and the data store of said by-path being controlled by said control store.

5. A digital data switch as defined in claim 4, wherein said synchronization information of each data word is adapted to identify signalling information in said data.

* * * * *

UNITED STATES PATENT AND TRADEMARK OFFICE
CERTIFICATE OF CORRECTION

PATENT NO. : 4,131,763
DATED : December 26, 1978
INVENTOR(S) : Ludwik Herschtal

It is certified that error appears in the above-identified patent and that said Letters Patent are hereby corrected as shown below:

In the masthead insert the following:

--[30]  Foreign Application Priority Data

Sept. 16, 1976  Australia  ..........PC7387--.

Signed and Sealed this

Twelfth Day of June 1979

[SEAL]

Attest:

RUTH C. MASON
Attesting Officer

DONALD W. BANNER
Commissioner of Patents and Trademarks